US009818137B1

(12) United States Patent
King

(10) Patent No.: US 9,818,137 B1
(45) Date of Patent: Nov. 14, 2017

(54) ESTIMATING THE OPERATING COST OF COMPUTING RESOURCES PROVIDED BY A SERVICE PROVIDER

(71) Applicant: Amazon Technologies, Inc., Seattle, WA (US)

(72) Inventor: Wesley Gavin King, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 907 days.

(21) Appl. No.: 13/866,777

(22) Filed: Apr. 19, 2013

(51) Int. Cl.
*G07B 17/00* (2006.01)
*G06Q 30/02* (2012.01)

(52) U.S. Cl.
CPC ................................. *G06Q 30/0283* (2013.01)

(58) Field of Classification Search
CPC ........ G06Q 40/00; G06Q 40/02; G06Q 40/10; G06Q 30/04; G06Q 30/0283; G06Q 20/10
USPC .......... 705/2, 7.11, 7.35, 14.27, 26.1, 30, 35, 705/400, 34
See application file for complete search history.

(56) References Cited

U.S. PATENT DOCUMENTS

| | | | | |
|---|---|---|---|---|
| 5,667,348 A * | 9/1997 | Chen | .................... | F16B 25/0078 411/418 |
| 5,920,846 A * | 7/1999 | Storch | ............. | G06Q 10/06311 379/15.03 |
| 7,072,848 B2 * | 7/2006 | Boyd | ..................... | G06Q 30/02 705/14.1 |
| 7,251,617 B1 * | 7/2007 | Walker | ................ | G06Q 20/085 705/14.27 |
| 7,287,000 B2 * | 10/2007 | Boyd | ................. | G06Q 30/0244 705/14.13 |
| 7,548,797 B2 * | 6/2009 | Perin, Jr. | ................. | G07F 9/026 700/236 |
| 7,630,931 B1 * | 12/2009 | Rachev | .................. | G06Q 40/00 705/35 |
| 8,180,700 B1 * | 5/2012 | Arnold | ................... | G06Q 40/00 705/35 |
| 8,395,621 B2 * | 3/2013 | Tung | ..................... | G06F 1/3203 345/440 |
| 8,396,771 B2 * | 3/2013 | Greenspan | ....... | G06Q 10/06312 705/35 |
| 8,438,099 B2 * | 5/2013 | Co | .......................... | G06Q 40/04 705/35 |
| 8,458,012 B2 * | 6/2013 | Swinson | ................ | G06Q 10/10 705/7.35 |
| 8,516,025 B2 * | 8/2013 | Synder | ............. | H03K 19/17728 708/233 |
| 8,655,698 B2 * | 2/2014 | West, II | ................. | G06Q 10/06 701/29.3 |
| 8,874,490 B2 * | 10/2014 | Shah | .................. | G06Q 30/0283 705/1.1 |
| 9,071,859 B2 * | 6/2015 | Lajoie | ..................... | G06Q 30/02 |
| 9,232,077 B2 * | 1/2016 | Yu | ........................... | H04L 12/14 |

(Continued)

*Primary Examiner* — Andrew Joseph Rudy
(74) *Attorney, Agent, or Firm* — Lee & Hayes, PLLC

(57) ABSTRACT

Data may be collected regarding the configuration and operation of computing resources in a customer network. The collected data may be utilized to identify computing resources available from a computing resource service provider that duplicate functionality provided by the computing resources operating in the customer network. Pricing data may then be utilized to compute an estimated price for operating the identified computing resources available from the service provider.

13 Claims, 8 Drawing Sheets

(56) References Cited

U.S. PATENT DOCUMENTS

| | | | | |
|---|---|---|---|---|
| 2002/0133364 A1* | 9/2002 | Grande | ................ | G06Q 30/06 705/26.1 |
| 2002/0198850 A1* | 12/2002 | Grande | ................ | G06Q 30/04 705/400 |
| 2006/0212359 A1* | 9/2006 | Hudgeon | ............ | G06Q 10/063 705/7.11 |
| 2012/0253830 A1* | 10/2012 | John | ..................... | G06Q 30/00 705/2 |

\* cited by examiner

ESTIMATING THE OPERATING COST OF COMPUTING RESOURCES PROVIDED BY A SERVICE PROVIDER

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

Computing service providers typically publish data describing the cost of utilizing the computing resources that they provide. For example, a computing service provider might publish data describing various configurations of available virtual machine instances (which might be referred to herein as "instances"), along with data describing a price for utilizing each of the configurations. Such a service provider might also publish data describing the price charged per unit of data storage utilized, per unit of network bandwidth utilized, and pricing information for the utilization of other types of computing resources. Despite the availability of detailed pricing information, however, it might still be difficult for potential customers of such a computing service provider to determine the future operating cost for utilizing computing resources that are provided by a service provider to duplicate functionality provided by computing resources that are operated by the customer.

The disclosure made herein is presented with respect to these and other considerations.

DETAILED DESCRIPTION

Figure 1:
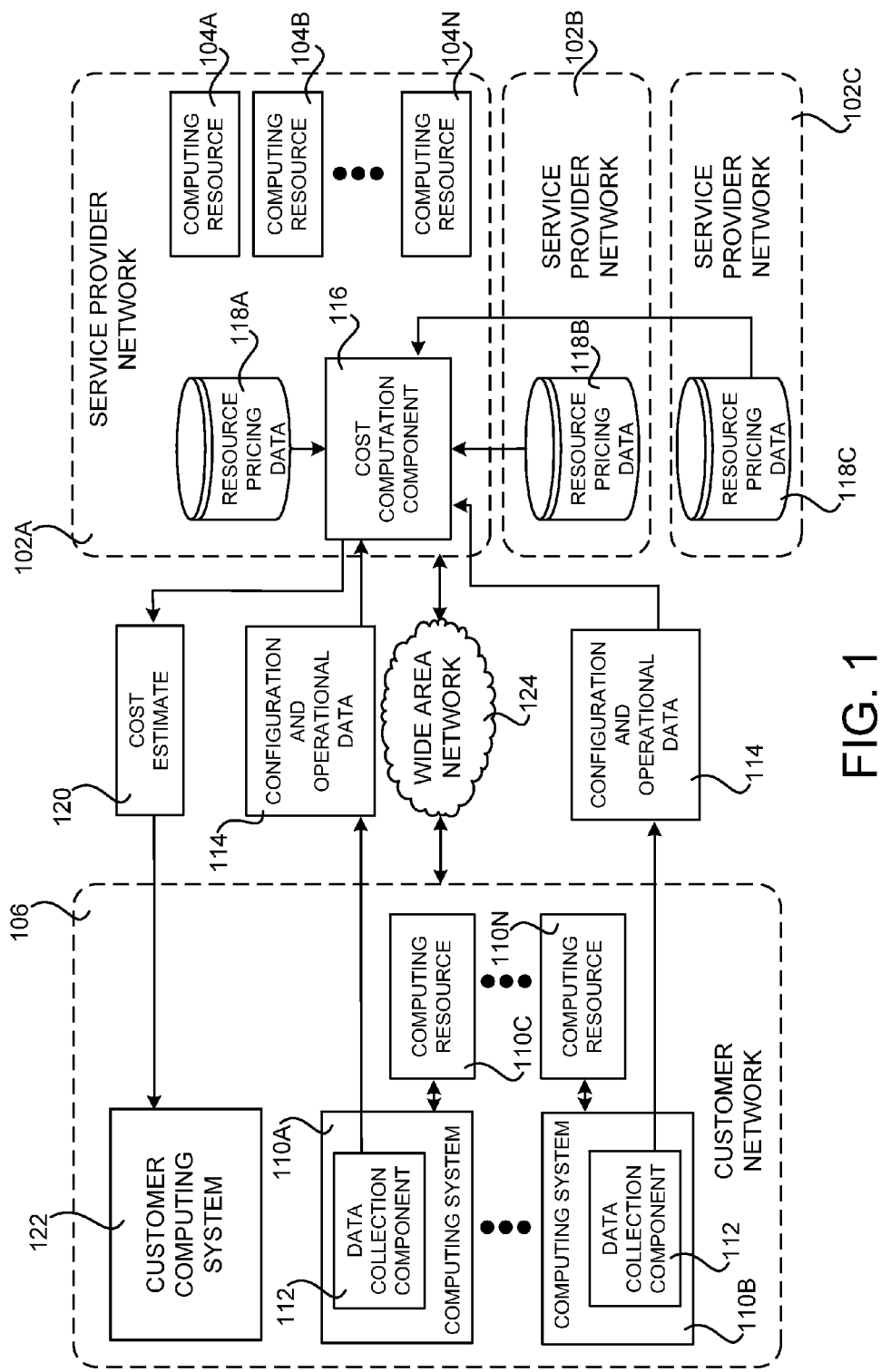
FIG. 1 is a network architecture diagram showing aspects of one illustrative mechanism described herein for estimating the operating cost of computing resources provided by a service provider, according to one embodiment disclosed herein.

The following detailed description is directed to technologies for computing an estimated cost of operating computing resources provided by a service provider. Utilizing the technologies described herein, a potential customer of a network-based computing service provider can easily determine the estimated future operating cost of utilizing computing resources provided by a service provider in order to duplicate functionality provided by existing computing resources operated by the customer.

According to embodiments presented herein, computer-implemented mechanisms are disclosed for estimating the cost of operating computing resources provided by a computing service provider. The mechanisms disclosed herein might operate in conjunction with a service provider operated network-based distributed computing environment (which may be referred to herein as a "service provider network") through which customers can purchase and utilize computing resources, such as virtual machine instances, data storage resources, database resources, networking resources, and other types of computing resources on a permanent or as-needed basis.

The service provider may charge a fee for operating the computing resources to the customer that creates and uses the resources. The service provider might also utilize various purchasing models to determine how much to charge the customer for the use of resources provided by the service provider. As mentioned above, customers of such a service provider can utilize the resources as building blocks to create custom solutions that provide various types of functionality, such as application hosting, backup and storage, content delivery, Web hosting, enterprise IT solutions, database services, and others.

As also mentioned above, it might be difficult for a potential customer of a computing service provider to determine the future operating cost for utilizing computing resources that are provided by a service provider and that duplicate functionality provided by computing resources that are operated by the customer. For example, a customer might operate physical server computers, database servers, and data storage devices in an on-premises customer network (i.e. a network operated by the customer at a physical location owned and/or operated by the customer). The customer might be interested in migrating the functionality provided by these computing resources into a service provider network. It might be difficult, however, for the customer to determine the anticipated future operating costs for operating computing resources in the service provider network that are capable of duplicating the functionality of the computing resources operating in the customer's on-premises network. The various embodiments disclosed herein address these and potentially other considerations.

In order to address at least some of the considerations set forth above, the embodiments disclosed herein provide a computer-implemented mechanism for estimating the cost of operating computing resources provided by a service provider. In one particular implementation, the mechanism includes a data collection component. The data collection component may be implemented as a software component configured to execute on computing systems operating in a customer network. For example, the data collection component might execute on physical server computers or virtual machine instances operating in a customer network. The data collection component might also be executed on computing resources in a service provider network that have been purchased by a customer. Executing the data collection component on computing resources in a service provider network may be desirable, for instance, when a customer is considering switching from one service provider to another service provider.

The data collection component is configured to collect configuration data and operational data for the computing resources. The configuration data might include, for instance, information regarding the configuration of server computers, data storage resources, database resources, and other computing resources. The operational data might describe operational aspects of the computing resources, such as network usage and performance, input/output ("I/O") usage and performance, processing load, and other operational aspects. The configuration data and operational data might be collected over a period of time, such as a week or a month. The data collection component is also configured to provide the configuration data and operational data to a cost computation component.

The cost computation component is implemented in one embodiment as a software component that is configured to execute on a computing system in the customer network or on a computing system in a service provider network. The cost computation component is also configured to receive the configuration data and the operational data from one or more data collection components operating in a customer network. When the cost computation component is executed in a customer network, the configuration data and the operational data may not be transmitted to a service provider network. The cost computation component is also configured to retrieve computing resource pricing data from one or more service providers. The resource pricing data describes the various types and configurations of computing resources available from each service provider, along with data describing the price for utilization of the computing resources.

The cost computation component is also configured to utilize the configuration data, the operational data, and/or the pricing data to identify a selection of computing resources available from a service provider that can duplicate the functionality provided by the computing resources operating in the customer network. Once the selection of computing resources has been identified, the cost computation component utilizes the pricing data to compute a cost estimate for operating the selection of computing resources provided by the service provider.

The cost computation component might select computing resources for inclusion in the cost estimate that minimize the estimated cost, while still providing the functionality required by the customer. The cost computation component might also compute a fixed cost or a range of estimated costs for utilizing the computing resources in the service provider network. The estimated price may then be communicated to a customer representative. In this way, a potential customer of a service provider can be given an estimated price for migrating functionality provided by their computing resources into a distributed computing environment provided by a service provider. Additional details regarding the various components and processes described above for estimating the operating cost of computing resources provided by a service provider will be presented below with regard to FIGS. 1-8.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram showing aspects of one illustrative mechanism described herein for estimating the operating cost of computing resources provided by a service provider. As described briefly above, the various mechanisms disclosed herein might operate in conjunction with one or more service provider networks 102A-102C (which may be referred to herein as a "service provider network 102"), in which customers can purchase and utilize computing resources 104A-104N (which may be referred to herein as "resources 104"), such as virtual machine instances or other types of computing resources, from a service provider on a permanent or as-needed basis. In the example shown in FIG. 1, one service provider operates the service provider network 102A, another service provider operates the service provider network 102B, and yet another service provider operates the service provider network 102C.

Although not illustrated in FIG. 1, each of the service provider networks 102A-102C may provide computing resources 104 for use by customers in the manner presented herein.

Each type or configuration of a computing resource 104 may be available from a service provider in different sizes. For example, a service provider might offer virtual machine instances or other types of data processing resources that are available for purchase and use that have many different configurations of processor capabilities, main memory, disk storage, and operating system. A service provider might also offer other types of resources 104 for purchase and use by customers. For example, a service provider might offer database resources, file or block data storage resources, and/or networking resources, such as load balancing resources, domain name service ("DNS") resources, virtual private cloud ("VPC") resources, virtual local area network ("VLAN") resources, and/or other types of resources on a permanent or as-needed basis. Details regarding several illustrative configurations for certain types of data processing resources will be provided below with regard to FIG. 7.

The service provider operating a service provider network 102 might also charge a fee for operating the resources 104 to the customer that creates and uses the resources 104. The fee charged for a particular resource 104 might be based upon the type and/or configuration of the resource 104. The fee charged for a particular resource 104 might also be based upon the amount of time the resource 104 is utilized. For example, in the case of a data processing resource, like a virtual machine instance, the fee for use of the resource might be charged based upon the amount of time the resource is utilized. In the case of a data storage resource 104, the fee might be computed based upon the amount of data stored and/or the amount of data transferred into or out of the resource. The fees for other types of resources 104 might also be based upon other considerations. A service provider might also utilize various purchasing models to determine the amount to charge a customer for use of resources 104 provided by the service provider. Details regarding several illustrative purchasing models utilized with certain types of resources 104 will also be described below with regard to FIG. 7.

The resources 104 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs") 124, such as the Internet. In the environment shown in FIG. 1, a service provider might operate one or more data centers configured to provide the resources 104 in the service provider network 102A to its customers. Details regarding the implementation of a service provider network 102 will be provided below with regard to FIGS. 5 and 6.

The various resources 104 described above might also be provisioned and de-provisioned as needed in an automated fashion. For example, a customer might submit a request to the service provider network 102A to instantiate a new instance of a computing resource 104, such as an instance of a virtual machine. In response to receiving such a request, a provisioning component (not shown in FIG. 1), or one or more other components within the service provider network 102A, might create the new instance of the virtual machine as requested by the customer. The customer may then be permitted to utilize the new instance of the virtual machine as desired.

When the customer has finished using the virtual machine instance, the customer may request that the virtual machine instance be de-provisioned. In response thereto, the provisioning component, or another component in the service provider network 102A, may cause the virtual machine instance to be de-provisioned. Other types of computing resources 104 might also be provisioned and de-provisioned in a similar manner. The service provider network 102 might also provide functionality for automatically scaling and/or de-scaling resources 104 based upon demand for the resources 104 or other factors.

As shown in FIG. 1, a customer or potential customer of a service provider might operate a customer network 106 that includes one or more computing resources 110A-110N (which might be referred to as the "resources 110"). As with the computing resources 104 in a service provider network 102, the computing resources 110 in a customer network 106 might include data processing resources, data storage resources, database resource, networking resources, and other types of computing resources. For instance, in the example shown in FIG. 2, the resources 110A and 110B are computing systems. The computing resources 110C-110N might be data storage resources, database resources, or other types of resources utilized by the resources 110A and 110B.

In some embodiments, the customer network 106 is an on-premises customer network. As mentioned briefly above, an on-premises customer network is a network operated by a customer at a physical location owned and/or operated by the customer. For example, a customer might operate the resources 110 in their office or other facility. The customer network 106 might also be implemented in a service provider network 102 that is provided by a service provider in the manner described above in other embodiments.

As mentioned above, it might be difficult for the customer of a computing service provider to determine the future operating cost for utilizing computing resources 104 that are provided by a service provider, and that duplicate functionality provided by computing resources 110 that are operated by the customer. For instance, in the example shown in FIG. 1, a customer might be interested in migrating the functionality provided by the computing resources 110 operating in the customer network 106 into a service provider network 102A. It might be difficult, however, for the customer to determine the anticipated future operating costs for operating computing resources 104 in the service provider network 102A that are capable of duplicating the functionality of the computing resources 110 operating in the customer network 106.

In order to assist a potential customer of a computing service provider in estimating the cost of operating computing resources 104 provided by the service provider, the embodiments presented herein utilize a data collection component 112. As mentioned briefly above, the data collection component 112 may be implemented as a software component configured to execute on computing resources 110, such as computing systems or virtual machine instances, operating in a customer network 106. When the customer network 106 is implemented using a service provider network 102, the data collection component 112 might also be executed on computing resources 104 in the service provider network 102. Executing the data collection component 112 on computing resources 104 in a service provider network 102 may be desirable, for instance, when a customer is considering switching from one service provider 102A to another service provider 102B. The data collection component 112 might also be implemented in hardware, in a combination of hardware and software, or in another manner. The data collection component 112 may be configured to execute in the background and to utilize minimal computing resources. In this way, execution of the data collection component 112 will not impact other processes executing on the same resource.

The data collection component 112 is configured to analyze the configuration and operation of computing resources 110 operating in the customer network 106 in order to collect configuration data and operational data (referred to herein as "configuration and operational data 114") for the computing resources 110. The configuration data might include, for instance, information regarding the configuration of server computers (e.g. the type of CPU, amount of RAM, installed operating system, etc.), data storage resources (e.g. amount of available storage), database resources, and other computing resources.

The operational data might describe operational aspects of the computing resources 110 in the customer network 106, such as network usage and performance, I/O usage and performance, processing load, and other operational aspects. The configuration and operational data 114 might be collected over a period of time, such as a week or a month. The data collection component 112 is also configured to provide the configuration and operational data 114 for the computing resources 110 in the customer network 106 to a cost computation component 116. Additional details regarding the operation of the data collection component 112 will be provided below with regard to FIG. 3.

The cost computation component 116 is implemented in one embodiment as a software component that is configured to execute on a data processing resource, such as a physical or virtual machine, in the customer network 106 or in the service provider network 102. In the example shown in FIG. 1, the cost computation component 116 is executing in the service provider network 102A. In the example described below with regard to FIG. 2, the cost computation component 116 is executing in the customer network 106. In this regard, it should be appreciated that while the embodiments disclosed herein are primarily presented in the context of a cost computation component 116 that executes in either a service provider network 102A or a customer network 106, the cost computation component 116 might also be executed in other locations. For example, in some embodiments a third-party (i.e. an entity other than a service provider or a customer of the service provider) might execute the cost computation component 116 on a computing system located in a network that they operate. In this example, the third-party might charge a fee or require some other form of payment for providing the services described herein. Other implementations might also be utilized.

The cost computation component 116 is configured to receive the configuration and the operational data 114 from the data collection components 112 operating in the customer network 106. As will be described in greater detail below with regard to FIG. 2, when the cost computation component 116 is executed within a customer network 106, the configuration and the operational data 114 is not transmitted to a service provider network 102.

The cost computation component 116 is also configured to retrieve computing resource pricing data 118A-118C (which may be referred to herein as "resource pricing data 118") from one or more service providers. The resource pricing data 118 describes the various types and configurations of computing resources 104 available from each service provider, along with data describing the price for utilization of the computing resources 104. Through the use of resource pricing data 118 obtained from multiple service providers, estimates for utilizing computing resources 104 from multiple service providers may be computed and provided to a customer or potential customer. Additional details regarding this process are provided below.

The cost computation component 116 is also configured to utilize the configuration and operational data 114 and/or the resource pricing data 118 to identify a selection of computing resources 104 available from a service provider that can duplicate the functionality provided by the computing resources 110 operating in the customer network 106. Once the selection of computing resources 104 has been identified, the cost computation component 116 utilizes the resource pricing data 118 to compute a cost estimate 120 for operating the selection of computing resources 104 provided by the service provider.

As mentioned above, the cost computation component 116 might compute a cost estimate 120 for multiple service providers utilizing the resource pricing data 118 for each service provider. For example, the cost computation component 116 might utilize the resource pricing data 118B to compute a cost estimate 120 for operating computing resources 104 in the service provider network 102B. Similarly, the cost computation component 116 might utilize the resource pricing data 118C to compute a cost estimate 120 for operating computing resources 104 in the service provider network 102C.

According to various embodiments, the cost computation component 116 might also select computing resources 104 within a service provider network 102 to minimize the cost estimate 120. The cost computation component 116 might also compute a range of estimated costs for utilizing the computing resources 104 in a service provider network 102.

Once the cost estimate 120 has been calculated, the cost computation component 116 may provide the cost estimate 120 to a customer representative by way of a customer computing system 122. For example, the cost estimate 120 might be made available via a Web page or transmitted via an e-mail message. Other mechanisms might also be utilized to communicate the cost estimate 120 to a customer representative or other authorized individual. In this way, a potential customer of a service provider can be given an estimated cost for migrating functionality provided by their computing resources 110 into a service provider network 102 provided by a service provider. Additional details regarding the operation of the cost computation component 116 will be provided below with regard to FIG. 4.

Figure 2:
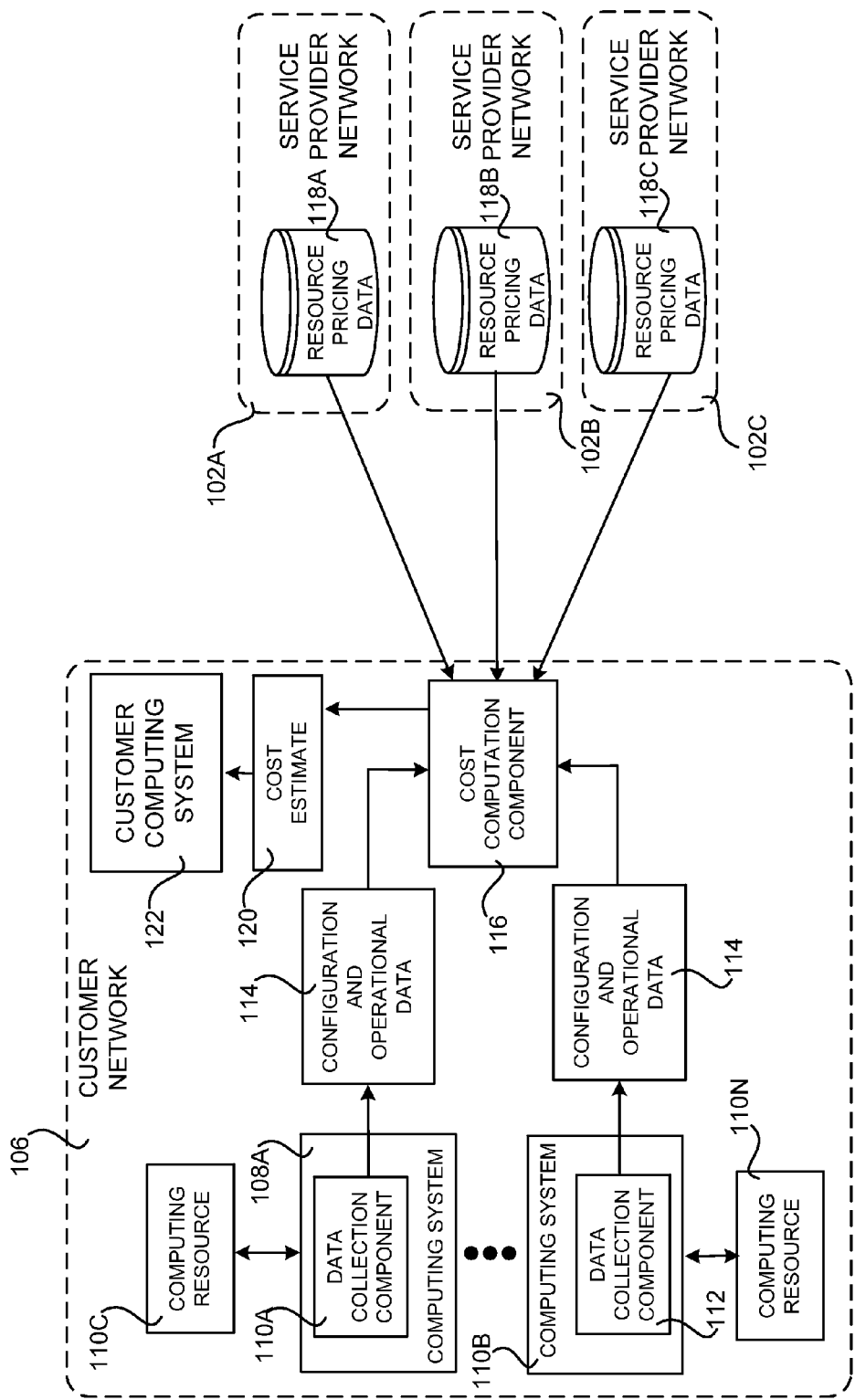
FIG. 2 is a network architecture diagram showing aspects of another illustrative mechanism presented herein for estimating the operating cost of computing resources provided by a service provider, according to one embodiment disclosed herein.

FIG. 2 is a network architecture diagram showing aspects of another illustrative mechanism presented herein for estimating the operating cost of computing resources 104 provided by a service provider, according to one embodiment disclosed herein. In the embodiment shown in FIG. 2, the cost computation component 116 is operating within the customer network 106. For example, the cost computation component 116 might be executed on a data processing resource, such as a physical computer or a virtual machine instance, in the customer network 106. By operating the cost computation component 116 within the customer network 106, it becomes unnecessary to transmit the configuration and operational data 114 to a service provider. In this way, potentially sensitive information regarding the configuration and/or operation of resources 110 in a customer network 106 is not transmitted outside the customer network 106.

As shown in FIG. 2, the cost computation component 116 might also obtain the resource pricing data 118 from various service providers by way of a suitable network, such as the Internet. The cost computation component 116 may then utilize the resource pricing data 118 and the configuration and operational data 114 in order to generate the cost estimate 120 in the manner described above. The cost computation component 116 may then provide the cost estimate 120 to a customer representative or other authorized individual by way of the customer computing system 112, or in another manner.

It should be appreciated that the functionality described herein as being performed by the data collection component 112 and the cost computation component 116 might be performed by one another, might be performed by other components, or might be performed by a combination of these or other components. Additionally, it should be appreciated that the functionality provided by these components might be implemented in software, hardware, or a combination of software and hardware.

Figure 3:
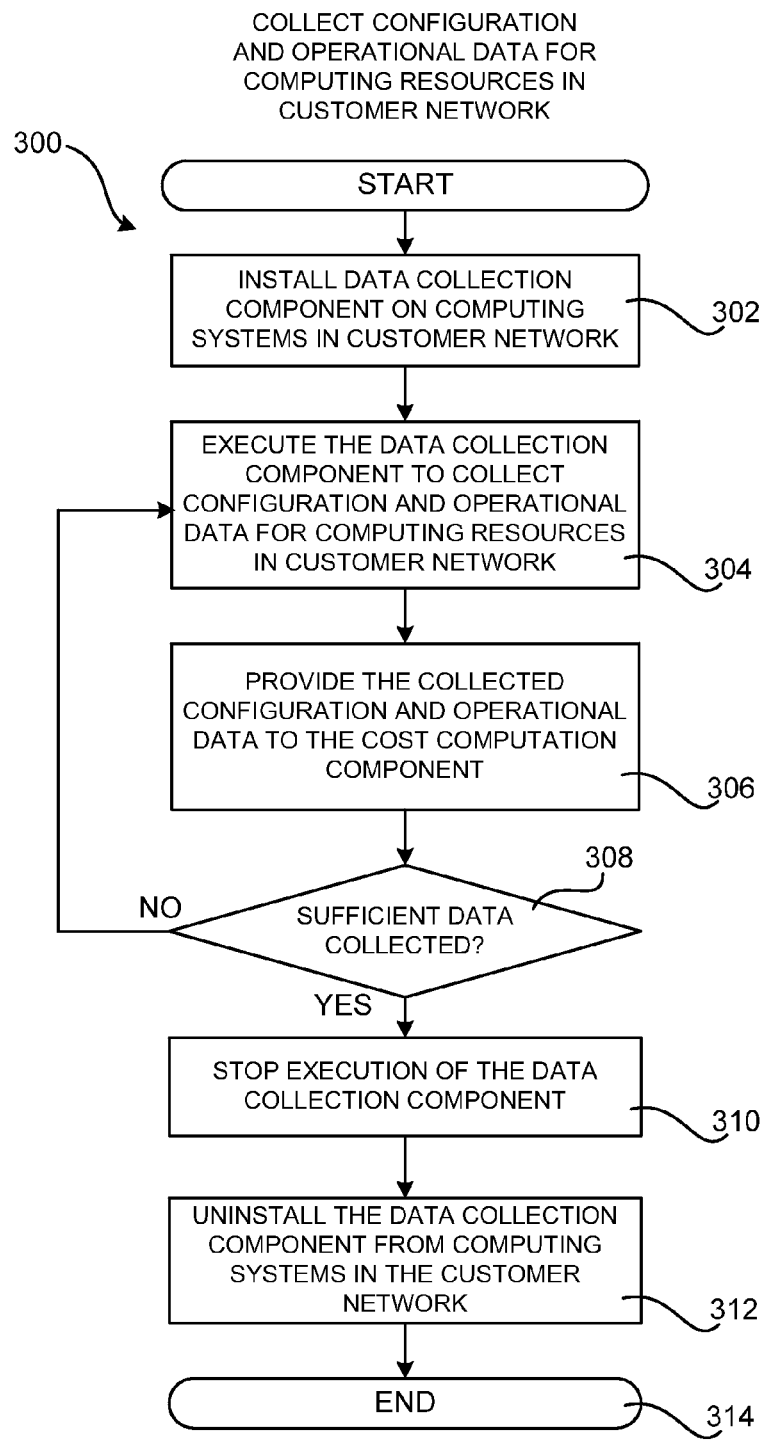
FIG. 3 is a flow diagram showing one illustrative routine for collecting configuration and operational data from computing resources operating in a customer network for use in computing an estimated operating cost of computing resources provided by a service provider, according to one embodiment disclosed herein.

FIG. 3 is a flow diagram showing one illustrative routine 300 for collecting configuration and operational data 114 from computing resources 110 operating in a customer network 106 for use in computing an estimated cost 120 for operating computing resources 104 provided by a service provider, according to one embodiment disclosed herein. It should be appreciated that the logical operations described herein with respect to FIG. 3, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 300 begins at operation 302, where the data collection component 112 is installed on data processing resources 110 in the customer network 106. For example, and as described above, the data collection component 112 might be installed on physical and/or virtual machines executing in an on-premises customer network. When the customer network 106 is implemented by a service provider, the data collection component 112 might be installed on physical and/or virtual machines in a service provider network 102. Once the data collection component 112 has been installed on the relevant computing resources 110 in the customer network 106, the routine 300 proceeds to operation 304.

At operation 304, the data collection component 112 is executed in order to collect the configuration and operational data 114 for the resources 110 in the customer network 106 for which a cost estimate 120 should be generated. As mentioned above, the configuration data describes the configuration of resources 110 in the customer network 106, such as the configuration (e.g. CPU, RAM, disk, etc.) of physical computers operating in the customer network 106 that might be migrated to virtual machine instances in a service provider network 102. Configuration data for other types of computing resources 110 in a customer network 106 might also be generated.

As also mentioned above, the operational data is data describing the operation of computing resources 110 in a customer network. For example, and without limitation, the operational data might include data describing the processing load handled by computing resources 110 in the customer network 106, the amount of memory utilized, the amount of data transmitted and/or received outside the customer network 106, and the amount of data stored in data storage resources within the customer network 106. Other types of operational data describing the operation of resources 110 within the customer network 106 might also be collected over a period of time.

From operation 304, the routine 300 proceeds to operation 306, where the data collection component 112 executing on each computing resource 110 in the customer network 106 provides the collected configuration and operation data 114 to the cost computation component 116. As mentioned above, the cost computation component 116 might be located in the service provider network 102 or in the customer network 106 in various embodiments. From operation 306, the routine 300 proceeds to operation 308.

At operation 308, the data collection component 112 executing on each computing resource 110 in the customer network 106 determines whether sufficient configuration and operational data 114 has been collected. The amount of configuration and operational data 114, or period of time within which to collect configuration and operational data 114, might be user-specified (e.g. collect data for one week or one month) in some embodiments. If sufficient configuration and operational data 114 has not been collected, the routine 300 proceeds back to operation 304, where additional configuration and operational data 114 may be collected.

If sufficient configuration and operational data 114 has been collected, the routine 300 proceeds from operation 308 to operation 310. At operation 310, the execution of the data collection component 112 on each computing resource 110 in the customer network 106 is stopped. The routine 300 then proceeds from operation 310 to operation 312, where the data collection component 112 may be uninstalled from each computing resource 110 in the customer network 106 upon which it was installed at operation 302. From operation 312, the routine 300 proceeds to operation 314, where it ends.

Figure 4:
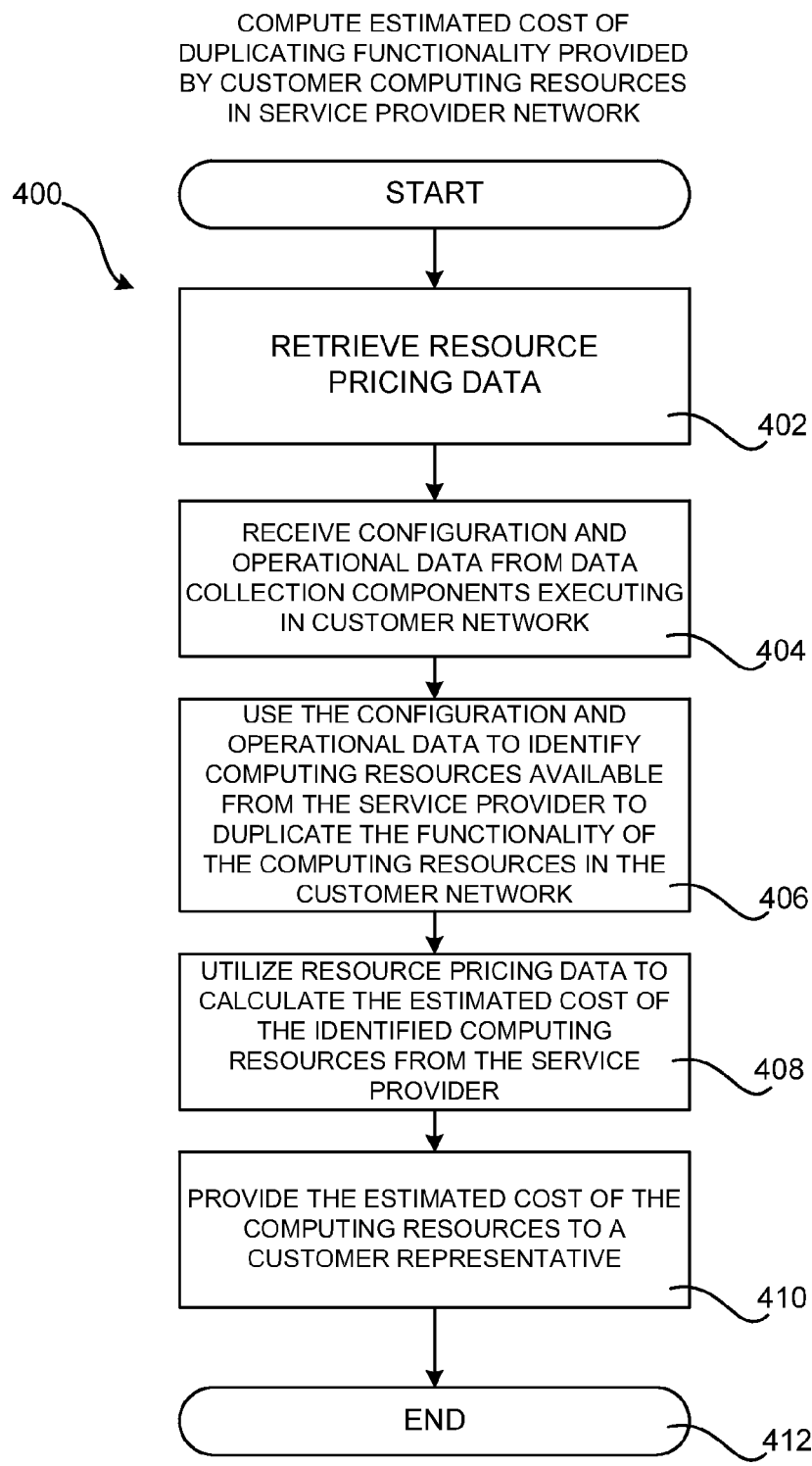
FIG. 4 is a flow diagram showing one illustrative routine for computing the estimated operating cost of computing resources provided by a service provider for duplicating the functionality provided by computing resources in a customer network, according to one embodiment disclosed herein.

FIG. 4 is a flow diagram showing one illustrative routine 400 for computing the estimated operating cost of computing resources 104 provided by a service provider for duplicating the functionality provided by computing resources 110 in a customer network 106, according to one embodiment disclosed herein. The routine 400 begins at operation 402, where the cost computation component 118 retrieves the resource pricing data 118. As mentioned above, the cost computation component 118 might retrieve the resource pricing data 118 from a single service provider in order to provide only a single cost estimate 120. In order to provide a cost estimate 120 for each of multiple service providers, the cost computation component 118 may retrieve resource pricing data 118 from multiple service providers in the manner shown in FIGS. 1 and 2 and described above.

From operation 402, the routine 400 proceeds to operation 404, where the cost computation component 116 receives the configuration and operational data 114 from each data collection component 112 executing on computing resources 110 in the customer network 106. The configuration and operational data 114 may be received periodically from each data collection component 112 and stored for use in computing the cost estimate 120. Alternately, each data collection component 112 might store the configuration and operational data 114 and provide this data to the cost computation component 116 when collection of the data 114 has been completed. Other implementations might also be utilized.

From operation 404, the routine 400 proceeds to operation 406, where the cost computation component 116 utilizes the configuration and operational data 114 to identify computing resources 104 available from a service provider that can be utilized to duplicate the functionality provided by the computing resources 110 in the customer network 106. For example, data processing resources might be identified that are available from a service provider that can duplicate functionality provided by data processing resources utilized in the customer network 106. Storage resources, database resources, networking resources, and other types of resources 104 might also be identified that are capable of providing functionality provided by similar resources 110 in the customer network 106.

In some implementations, the cost computation component 116 might select computing resources 104 available from a service provider that minimize the cost of duplicating the functionality provided by the resources 110 in the customer network 106. For example, if the resources 110 in the customer network 106 process a light load most of the time but the processing load periodically spikes, then resources 104 in the service provider network 102 might be chosen that can be auto-scaled in response to demand. In this way, the cost of duplicating the functionality provided by the resources 110 in the customer network 106 may be minimized. Other factors might also be considered and utilized in order to select resources 104 that minimize the cost estimate 120.

The processing performed by the computing resources 110 in the customer network 106 over time might also be utilized as one factor when selecting resources 104 available from a service provider to include in the cost estimate 120. For example, if a computer exists in the customer network 106 that regularly has no processing load, an assumption might be made that a virtual machine instance in a service provider network 102 can be periodically stopped in order to minimize the operational cost. In a similar manner, if the resources 110 utilize certain data regularly, then a high performance data storage resource in the service provider network 102 might be included in the cost estimate 120. If the resources 110 utilize data only occasionally, a long-term data storage resource in the service provider network 102 having a lower cost might be included in the cost estimate 120. The cost computation component 116 might also consider other factors when selecting resources 104 provided by a service provider for inclusion in a cost estimate 120 including, but not limited to, the data center that will host the resources 104, the geographic location of the resources 104, a future anticipated cost of computing resources and/or network bandwidth, and/or other factors.

From operation 406, the routine 400 proceeds to operation 408, where the cost computation component 116 utilizes the resource pricing data 118 to compute a cost estimate 120 for the resources 104 identified at operation 406. As mentioned above, the computation component 116 might be configured to minimize the cost estimate 120. The computation component 116 might also be configured to provide a single fixed estimated cost or a range of estimate costs. The range of prices might be based upon anticipated workload, bandwidth utilization, storage utilization, and/or other factors.

Once the estimated cost 120 has been generated, the routine 400 proceeds from operation 408 to operation 410, where the cost computation component 116 provides the estimated cost 120 to a customer representative or other authorized individual. For example, and as described above, the cost computation component 116 might provide the cost estimate 120 to a customer computing system 122 by way of a Web page, an e-mail message, or through the use of another mechanism. From operation 410, the routine 400 proceeds to operation 412, where it ends.

Figure 5:
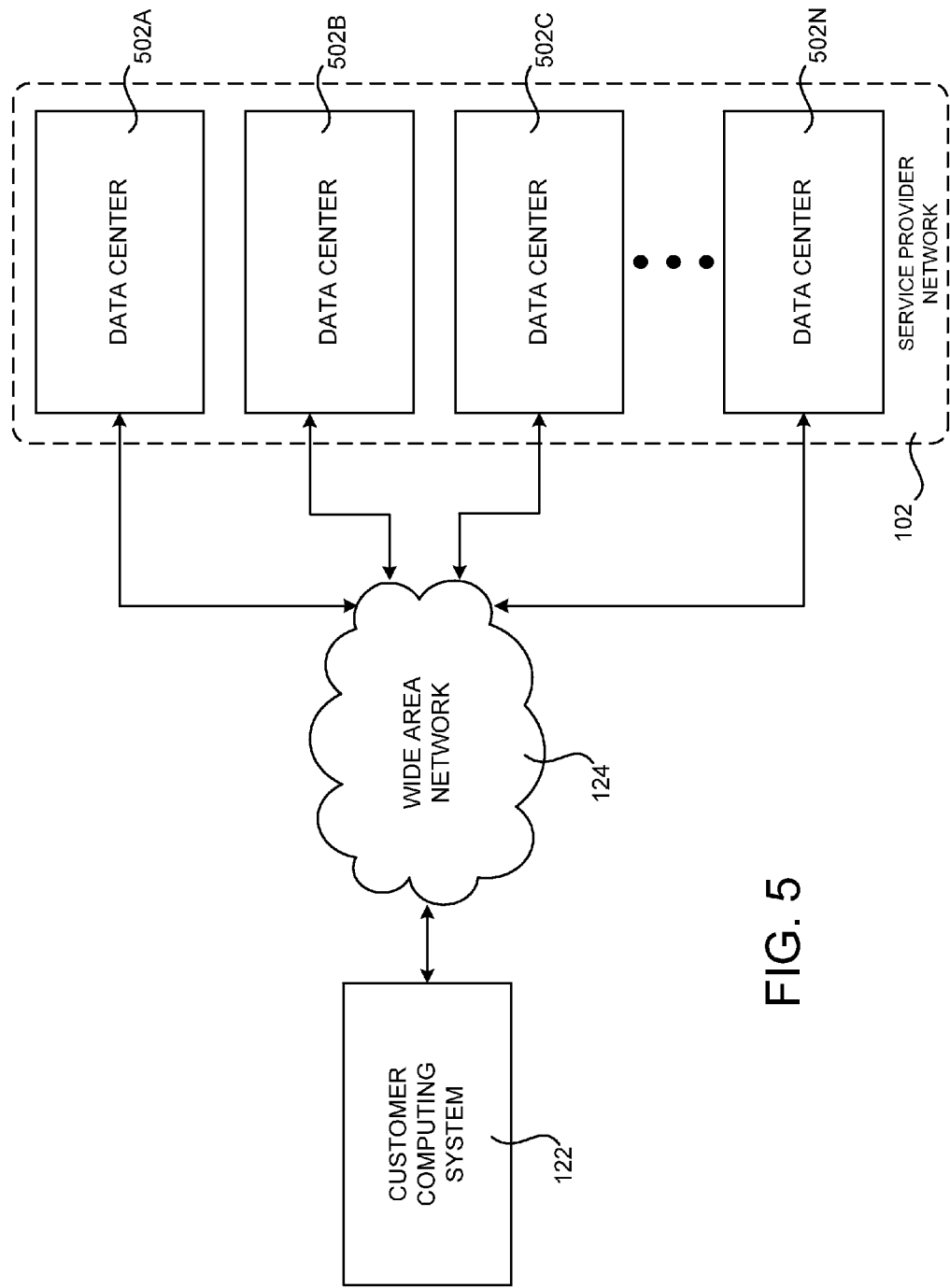
FIG. 5 is a system and network diagram that shows one illustrative operating environment for the embodiments disclosed herein that includes a service provider network that may be configured to provide functionality for estimating the operating cost of computing resources provided by a service provider, according to one embodiment disclosed herein.

FIG. 5 is a system and network diagram that shows one illustrative operating environment for the embodiments disclosed herein that includes a service provider network 102 that may be configured to provide functionality for estimating the operating cost of computing resources 104 provided by a service provider, according to one embodiment disclosed herein. As discussed briefly above, the service provider network 102 can provide computing resources 104 on a permanent or an as-needed basis. The computing resources 104 provided by the service provider network 104 may include various types of resources, such as data processing resources, data storage resources, networking resources, data communication resources, and the like. Each type of computing resource may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like. Additional details regarding some types of computing resources that may be offered for use through a service provider network 102 will be provided below with regard to FIG. 7.

The computing resources 104 provided by the service provider network 102 are enabled in one implementation by one or more data centers 502A-502N (which may be referred herein singularly as "a data center 502" or in the plural as "the data centers 502"). The data centers 502 are facilities utilized to house and operate computer systems and associated components. The data centers 502 typically include redundant and backup power, communications, cooling, and security systems. The data centers 502 might also be located in geographically disparate locations. One illustrative configuration for a data center 502 that implements the concepts and technologies disclosed herein for computing an estimated cost for operating computing resources 104 in a service provider network 102 will be described below with regard to FIG. 6.

The customers and other users of the service provider network 102 may access the computing resources provided by the service provider network 102 over a WAN 124. Although a WAN 124 is illustrated in FIG. 5, it should be appreciated that a local-area network ("LAN"), the Internet, or any other networking topology known in the art that connects the data centers 502 to remote customers and other users may be utilized. It should also be appreciated that combinations of such networks might also be utilized.

Figure 6:
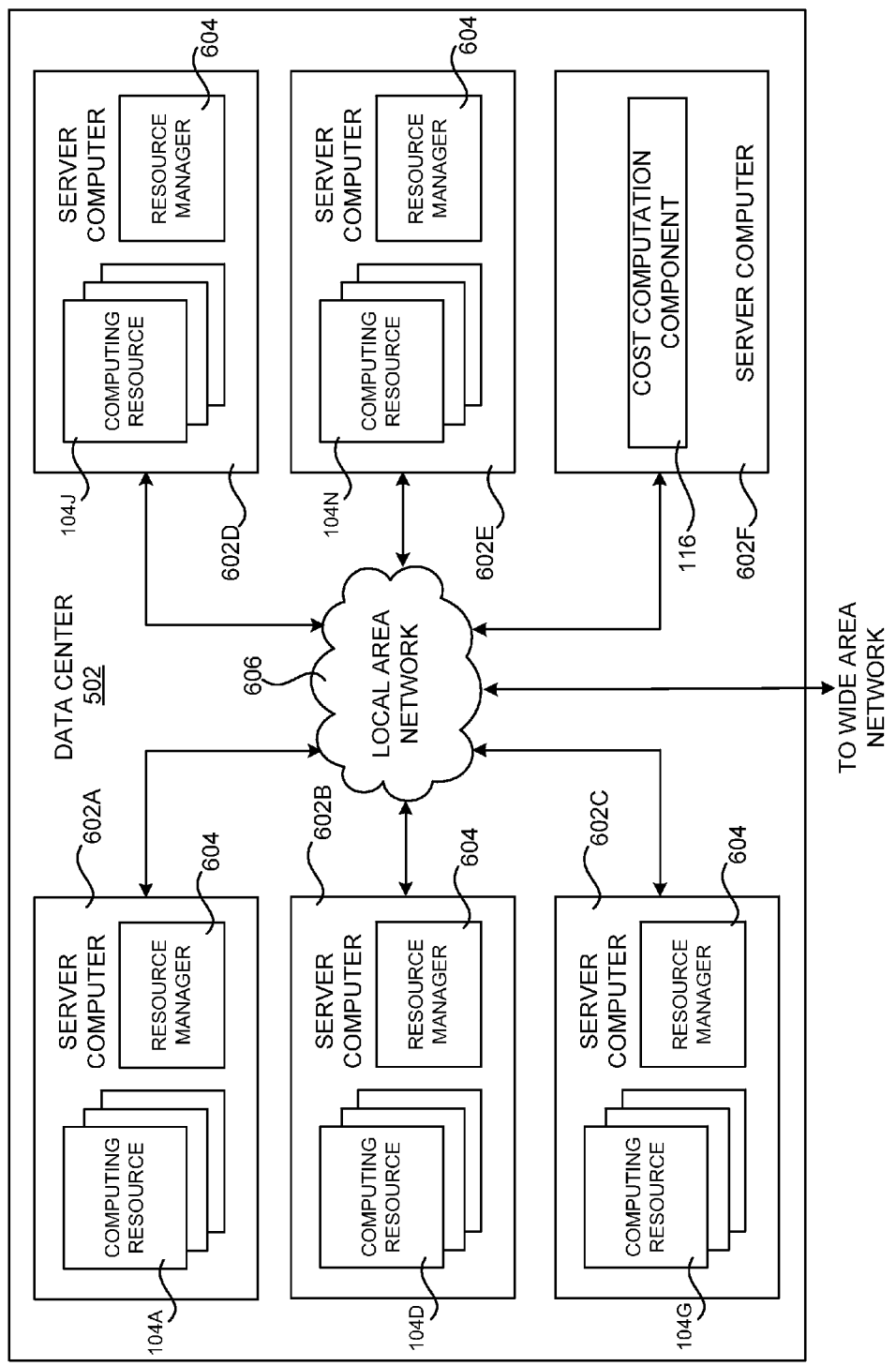
FIG. 6 is a computing system diagram that illustrates one configuration for a data center that implements aspects of the concepts and technologies disclosed herein for estimating the operating cost of computing resources provided by a service provider, according to one embodiment disclosed herein.

FIG. 6 is a computing system diagram that illustrates one configuration for a data center 502 that implements aspects of the concepts and technologies disclosed herein for estimating the operating cost of computing resources 104 provided by a service provider, according to one embodiment disclosed herein. The example data center 502 shown in FIG. 6 includes several server computers 602A-602F (which may be referred herein singularly as "a server computer 602" or in the plural as "the server computers 602") for providing computing resources 104.

The server computers 602 may be standard tower or rack-mount server computers configured appropriately for providing the computing resources described herein. For example, in one implementation the server computers 602 are configured to provide the computing resources 104A-104N. As mentioned above, the computing resources 104 might be data processing resources, data storage resources, database resources, networking resources, and others. Some of the servers 602 might also be configured to execute a resource manager 604 capable of instantiating and/or managing resources 104. In the case of virtual machine instances, for example, the resource manager 604 might be a hypervisor or another type of program configured to enable the execution of multiple virtual machine instances on a single server 602, for example.

The data center 502 shown in FIG. 6 also includes a server computer 602F that may be reserved for executing various software components for managing the operation of the data center 502, the server computers 602, and the computing resources 104. In some embodiments, such as the embodiment described above with regard to FIG. 1, the server computer 602F might also be configured to execute the cost computation component 116. Other computing systems within the data center 502 might also be utilized to execute this component. As mentioned above, the cost computation component 116 might also be executed within a customer network 106 in other embodiments. Other configurations might also be utilized.

In the example data center 502 shown in FIG. 6, an appropriate LAN 606 is utilized to interconnect the server computers 602A-602F. The LAN 606 is also connected to the WAN 124 illustrated in FIG. 5. It should be appreciated that the configuration and network topology illustrated in FIGS. 1-6 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 502A-502N, between each of the server computers 602A-602F in each data center 502, and, potentially, between computing resources 104 in each of the data centers 502. It should be appreciated that the data center 502 described with respect to FIG. 6 is merely illustrative and that other implementations might be utilized.

Figure 7:
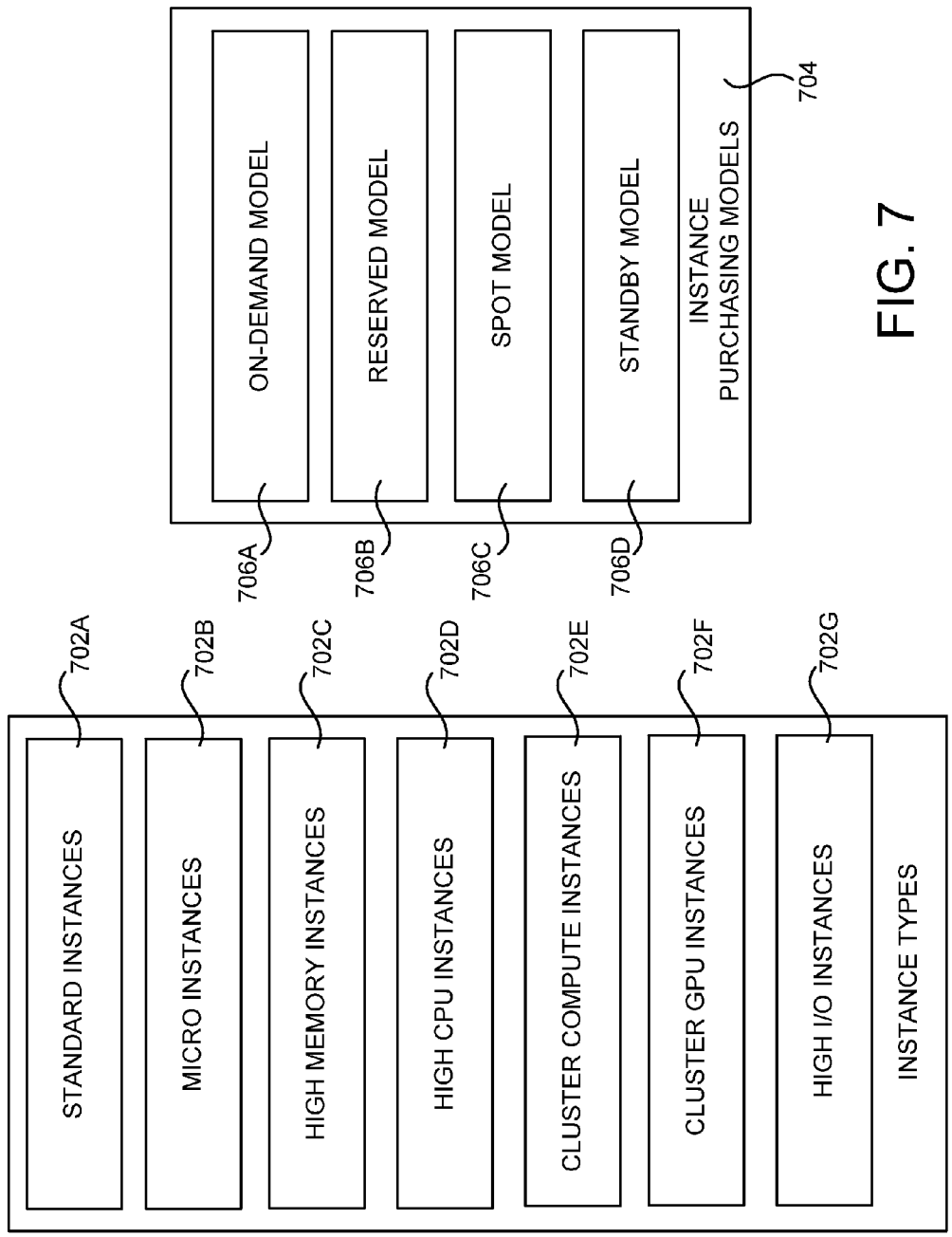
FIG. 7 is a block diagram showing aspects of various types of computing resources and purchasing models for the computing resources that might be provided by a computing service provider and utilized in embodiments disclosed herein.

FIG. 7 is a block diagram showing aspects of various types of computing resources 104 and purchasing models for the computing resources 104 that might be provided by a computing service provider and utilized in embodiments disclosed herein. As described briefly above, one example of the computing resources 104 that might be provided by a service provider network 102 are data processing resources, such as virtual machine instances. The virtual machine instances provided by a service provider may be made available to customers in a number of different types, or configurations. FIG. 7 illustrates several example instance types that might be made available by a service provider through a service provider network 102: standard instances; micro instances; high memory instances; high central processing unit ("CPU") instances; cluster compute instances; cluster graphics processing unit ("GPU") instances, and high input/output ("I/O") instances. Aspects of each of these instance types will be described below.

Standard instances 702A are instances that are configured with generally proportional amounts of CPU and memory. Standard instances 702A may be suitable for common computing applications. Standard instances 702A may be made available in various sizes in some embodiments. For example, "small", "medium", "large", and "extra large" instances may be made available, with each of these instances having greater amounts of CPU and memory, while maintaining approximately similar ratios of CPU to memory.

Micro instances 702B are instances that provide a small amount of consistent CPU resources and allow CPU capacity to be increased in short bursts when additional cycles are available. Micro instances 702B may be suited for lower throughput applications and Web sites that require additional compute cycles periodically.

High memory instances 702C are instances that have proportionally more random access memory ("RAM") resources than CPU resources. High memory instances 702C may be suitable for high throughput applications, including database and memory caching applications. In contrast, high CPU instances 702D have proportionally more CPU resources than RAM memory resources and are well suited for compute-intensive applications.

Cluster compute instances 702E are instances that offer proportionally high CPU resources with increased network performance. Cluster compute instances 702E are well suited for High Performance Compute ("HPC") applications and other demanding network-bound applications. Cluster GPU instances 702F are virtual machine instances that provide general-purpose GPUs with proportionally high CPU and increased network performance for applications benefitting from highly parallelized processing, including HPC, rendering and media processing applications. While cluster compute instances 702E provide the ability to create clusters of instances connected by a low latency, high throughput network, cluster GPU instances 702F provide an additional option for applications that can benefit from the efficiency gains of the parallel computing power of GPUs over what can be achieved with traditional processors.

High I/O instances 702G are instances that provide very high disk I/O performance and are ideally suited for many high performance database workloads. High I/O instances 702G may utilize solid state-drive ("SSD")-based local instance storage for high I/O throughput. High I/O instances 702G might also provide high levels of CPU, memory, and network performance. It should be appreciated that the various instance types described above are merely illustrative. Other instance types not described herein might be utilized with the various concepts and technologies described herein. Additionally, in some embodiments, virtual machine instances may be made available in various sizes having continuous ratios of CPU to memory.

It should also be appreciated that the various instance types described above might be utilized with various operating systems. For example, a customer of a service provider might request to execute a high CPU instance 702D executing the LINUX operating system. Similarly, a customer or other user of the of a service provider network 102 might request to use a cluster compute instance 702E executing the MICROSOFT WINDOWS SERVER operating system. Other operating systems might also be utilized.

The cost computation component 116 might select one or more of the instance types described above for use in duplicating the functionality provided by the computing resources 110 used in the customer network 106. The instance type, or types, selected might be based upon the configuration and operational data 114 collected by the data collection component 112 regarding the resources 110 in the customer network 106. As mentioned above, the cost computation component 116 might utilize various factors to select instance types for replicating some or all of the functionality of the resources 110 in the customer network 106 while minimizing the cost estimate 120.

As also shown in FIG. 7, the various instance types described above, and the other computing resources 104 described herein, might be priced according to various instance purchasing models 704. For instance, in the example shown in FIG. 7, computing resources 104 may be priced according to an on-demand model 706A, a reserved model 706B, a spot model 706C, and/or a standby model 706D. Aspects of each of these purchasing models are described in greater detail below.

Computing resources 104 priced according to the on-demand model 706A are resources that are paid for and in active use by a customer. The on-demand model 706A allows customers of a service provider to pay for capacity per unit of time, such as an instance-hour, without requiring a long-term commitment. This may free the customer from the costs and complexities of planning, purchasing, and maintaining hardware, and might effectively transform what are commonly large fixed costs into much smaller variable costs.

Computing resources 104 priced according to the reserved model 706B are computing resources 104 that are reserved for a customer in exchange for a payment. The reserved model 706B provides a customer the option to make a one-time payment for each resource 104 they want to reserve. In turn, the customer may receive a discount on the hourly usage charge for reserved computing resources 104 as compared to on-demand resources. After the customer makes the one-time payment for reserved resources 104, the reserved resources are reserved for the customer and the customer has no further obligation. The customer may choose to run the reserved resources 104 for the discounted usage rate for the duration of a chosen term. If the customer does not use the reserved resources, the customer will not pay usage charges on these resources 104.

The spot model 706C allows customers to bid on unused capacity in a service provider network 102. The customer can run the resources 104 priced according to the spot model 706C for as long as their bid exceeds a current market price, called the "spot market price". The spot market price may fluctuate based upon the supply of resources and the customer demand for the resources. Spot resources may be terminated if a customer's maximum bid no longer exceeds the current spot market price.

In order to obtain spot resources, a customer may place a request for spot resources that specifies the type and desired number of spot resources and the maximum price the customer is willing to pay. If the customer's maximum price bid exceeds the current spot market price for desired resources, the customer's request will be fulfilled and the customer's spot resources will run until either the customer chooses to terminate them or the spot market price increases above the customer's maximum price (whichever is sooner). Various components operating within a service provider network 102 may manage the market for the spot resources, including setting the current spot market price.

Computing resources 104 purchased according to the standby model 706D, which might be referred to as "standby resources", are resources 104 that have been acquired on behalf of a customer and that are made ready for near immediate use by the customer in the manner described herein. The price charged for standby resources is typically less than the price charged for on-demand resources, since the standby resources may be terminated in the same manner as spot resources. In one embodiment, standby resources are priced higher than spot resources and reserved resources, but lower than on-demand resources.

It should be appreciated that the various purchasing models 704 described above are merely illustrative and that other mechanisms may be utilized to set the pricing for the various types of computing resources 104 provided by a service provider network 104. It should also be appreciated that the embodiments disclosed herein may be utilized with any of the resource types and purchasing models 704 shown in FIG. 7 and other configurations of computing resources 104 and purchasing models 704 not shown in FIG. 7 or described herein. Additionally, it should be appreciated that other types of computing resources 104 might also be priced according to the purchasing models 704 shown in FIG. 7 or other purchasing models. As discussed above, the embodiments disclosed herein might also be utilized with other types of computing resources 104, such as data storage resources, database resources, networking resources, and others. These resources might also be available in various configurations, capacities, arrangements, and priced according to various purchasing models.

According to various embodiments, the cost computation component 116 might utilize one or more of the purchasing models 704 described above when computing the cost estimate 120. For example, because resources priced according to the reserved model 706B may be purchased for a lower up front cost as compared to other purchasing models, the cost computation component 116 might include the possibility of using resources 104 priced according to the reserved model 706B in the cost estimate 120. The cost computation component 116 might also utilize the operational data collected by the data collection component 112 to determine the minimum amount of processing capacity needed by the customer over time. The cost computation component 112 might then recommend that the customer purchase at least this much capacity using the reserved model 706B.

In other embodiments, the cost computation component 116 might suggest purchasing resources 104 priced according to the spot model 706C. For example, if the cost computation component 116 determines based upon the operational data that the customer experiences spikes in demand every few days, the cost computation component 116 might recommend the use of a certain number of resources priced according to the spot model 706C. The cost computation component 116 might also provide a cost estimate 120 based upon current spot market prices. In general, therefore, it should be appreciated that the cost computation component 116 might select different resource types and/or purchasing models 704 for use in computing a cost estimate 120 based upon the workload experienced by the computing resources 110 operating in the customer network 106, the functionality provided by the computing resources 110, and/or other factors.

Figure 8:
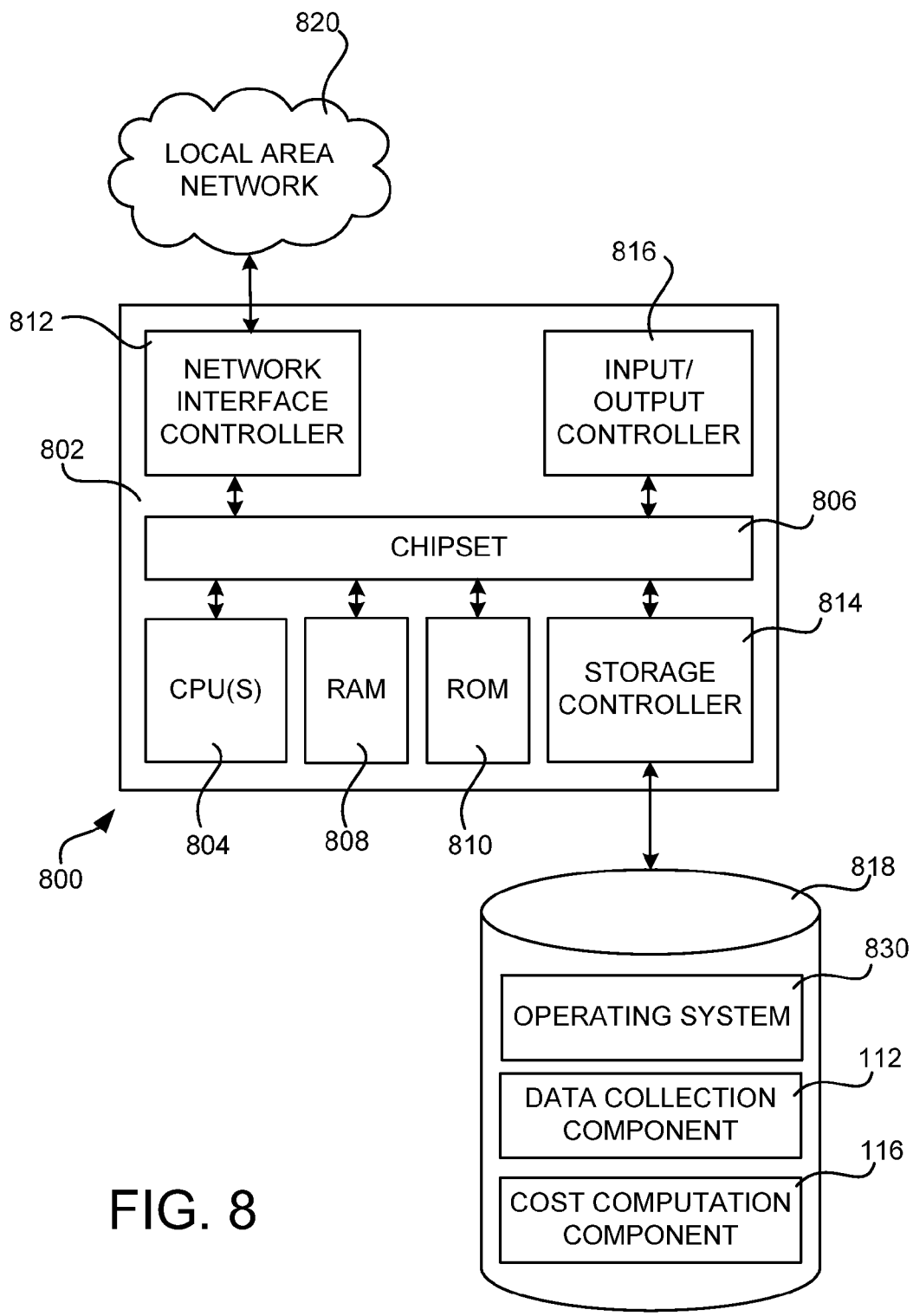
FIG. 8 is a computer architecture diagram showing an illustrative computer hardware architecture for implementing a computing device that might be utilized to implement aspects of the various embodiments presented herein.

FIG. 8 shows an example computer architecture for a computer 800 capable of executing the program components described above for estimating the operating cost of computing resources 104 provided by a service provider. The computer architecture shown in FIG. 8 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 8 may be utilized to execute the data collection component 112 and/or the cost computation component 116 shown in FIGS. 1 and 2, and described above.

The computer 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a random access memory ("RAM") 808, used as the main memory in the computer 800. The chipset 806 may further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM may also store other software components necessary for the operation of the computer 800 in accordance with the embodiments described herein.

The computer 800 may operate in a networked environment using logical connections to remote computing devices and computer systems through a network, such as the local area network 820. The chipset 806 may include functionality for providing network connectivity through a NIC 812, such as a gigabit Ethernet adapter. The NIC 812 is capable of connecting the computer 800 to other computing devices over the network 820. It should be appreciated that multiple NICs 812 may be present in the computer 800, connecting the computer to other types of networks and remote computer systems.

The computer 800 may be connected to a mass storage device 818 that provides non-volatile storage for the computer. The mass storage device 818 may store system programs, application programs, other program modules, and data, which have been described in greater detail herein. The mass storage device 818 may be connected to the computer 800 through a storage controller 814 connected to the chipset 806. The mass storage device 818 may consist of one or more physical storage units. The storage controller 814 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 may store data on the mass storage device 818 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 818 is characterized as primary or secondary storage, and the like.

For example, the computer 800 may store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 may further read information from the mass storage device 818 by detecting the physical states or characteristics of one or more particular locations within the physical storage units.

In addition to the mass storage device 818 described above, the computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 800.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 818 may store an operating system 830 utilized to control the operation of the computer 800. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 818 may store other system or application programs and data utilized by the computer 800, such as the data collection component 112, the cost computation component 116, and/or any of the other software components and data described above. The mass storage device 818 might also store other programs and data not specifically identified herein.

In one embodiment, the mass storage device 818 or other computer-readable storage media is encoded with computer-executable instructions which, when loaded into the computer 800, transforms the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various routines described above with regard to FIGS. 3 and 4. The computer 800 might also include computer-readable storage media for performing any of the other computer-implemented operations described herein.

The computer 800 may also include one or more input/output controllers 816 for receiving and processing input from a number of input devices, such as a keyboard, a mouse, a touchpad, a touch screen, an electronic stylus, or other type of input device. Similarly, the input/output controller 816 may provide output to a display, such as a computer monitor, a flat-panel display, a digital projector, a printer, a plotter, or other type of output device. It will be appreciated that the computer 800 may not include all of the components shown in FIG. 8, may include other components that are not explicitly shown in FIG. 8, or may utilize an architecture completely different than that shown in FIG. 8.

Based on the foregoing, it should be appreciated that technologies for estimating the operating cost of computing resources provided by a service provider have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-readable storage medium having computer-executable instructions stored thereupon which, when executed by a computer, cause the computer to:
    obtain, via a data collection component, configuration data describing a configuration of a plurality of computing resources in a network;
    obtain, via a data collection component, operational data describing operation of the plurality of computing resources in the network;
    obtain computing resource pricing data describing a price for utilizing computing resources available from a service provider;
    utilize the configuration data and the operational data to identify a selection of computing resources available from the service provider for duplicating functionality provided by the plurality of computing resources in the network; and
    utilize the computing resource pricing data to compute an estimated price for the identified selection of computing resources available from the service provider, whereby the estimated price is utilized in a determination as to whether to migrate the computing resources in the network to the computing resources available from the service provider,
    wherein the data collection component is configured to analyze the configuration and operation of the computing resources in the network in order to collect the configuration data and the operational data, and
    wherein the computing resources comprise at least one of database resources, file or block data storage resources, load balancing resources, domain name service resources, virtual private cloud resources, or virtual local area network resources.

2. The computer-readable storage medium of claim 1, wherein the estimated price for the selection of computing resources available from the service provider comprises a range of estimated prices for the selection of computing resources available from the service provider.

3. The computer-readable storage medium of claim 1, wherein compute an estimated price for the selection of computing resources available from the service provider comprises computing a lowest estimated price for the selection of computing resources available from the service provider.

4. The computer-readable storage medium of claim 1, wherein a computing device on the network is configured to compute the estimated price for the selection of computing resources available from the service provider without transmitting the configuration data or the operational data to the service provider network.

5. A computer-readable storage medium having computer-executable instructions stored thereupon which, when executed by a computer, cause the computer to:
    collect data from a plurality of computing resources operating on a network, the data comprising configuration data describing a configuration of the plurality of computing resources operating on the network, and operational data describing operation of the plurality of computing resources operating on the network;
    obtain computing resource pricing data from a plurality of service providers, the computing resource pricing data describing a price for utilizing computing resources provided by a service provider; and
    utilize the data collected from the plurality of computing resources operating on the network and the computing resource pricing data to compute an estimated cost for each of the plurality of service providers for duplicating functionality provided by the plurality of computing resources operating on the network using computing resources provided by a service provider, whereby the estimated price is utilized in a determination as to whether to migrate the computing resources in the network to the computing resources provided by the service provider,
    wherein collecting the data comprises analyzing the configuration and operation of the computing resources in the network in order to collect the configuration data and the operational data, and
    wherein the computing resources comprise at least one of database resources, file or block data storage resources, load balancing resources, domain name service resources, virtual private cloud resources, or virtual local area network resources.

6. The computer-readable storage medium of claim 5, wherein a computing device is configured to utilize the data collected from the plurality of computing resources operating on the network and the computing resource pricing data to compute the estimated cost for each of the plurality of service providers.

7. The computer-readable storage medium of claim 5, wherein the network is an on-premises network.

8. The computer-readable storage medium of claim 5, wherein the estimated cost for a service provider comprises a lowest estimated cost for the service provider to provide computing resources for duplicating the functionality provided by the plurality of computing resources operating on the network.

9. The computer-readable storage medium of claim 5, wherein the estimated cost for a service provider comprises a range of estimated costs for the service provider to provide computing resources for duplicating the functionality provided by the plurality of computing resources operating on the network.

10. A computer-implemented method for computing an estimated cost for utilizing computing resources provided by a service provider, the method comprising performing computer-implemented operations for:

obtaining data from a plurality of computing resources in a network, the data comprising configuration data describing a configuration of the plurality of computing resources operating on the network, and operational data describing operation of the plurality of computing resources operating on the network;

obtaining pricing data from a service provider describing a price for utilizing computing resources provided by the service provider; and utilizing the data collected from the plurality of computing resources in the network and the pricing data to compute an estimated cost for utilizing computing resources provided by the service provider to duplicate functionality provided by the plurality of computing resources in the network, whereby the estimated price is utilized in a determination as to whether to migrate the computing resources in the network to the computing resources provided by from the service provider, wherein obtaining the data comprises analyzing the configuration and operation of the computing resources in the network in order to collect the configuration data and the operational data, and wherein the computing resources comprise at least one of database resources, file or block data storage resources, load balancing resources, domain name service resources, virtual private cloud resources, or virtual local area network resources.

11. The computer-implemented method of claim 10, wherein a computer provided by the service provider is configured to compute the estimated cost.

12. The computer-implemented method of claim 10, wherein a computer in the network is configured to compute the estimated cost without transmitting the configuration data or the operational data to the service provider.

13. The computer-implemented method of claim 12, wherein the network is an on-premises network.

* * * * *